Jan. 1, 1929.   G. A. DALTON ET AL   1,697,720
GEAR
Filed March 25, 1927   2 Sheets-Sheet 1
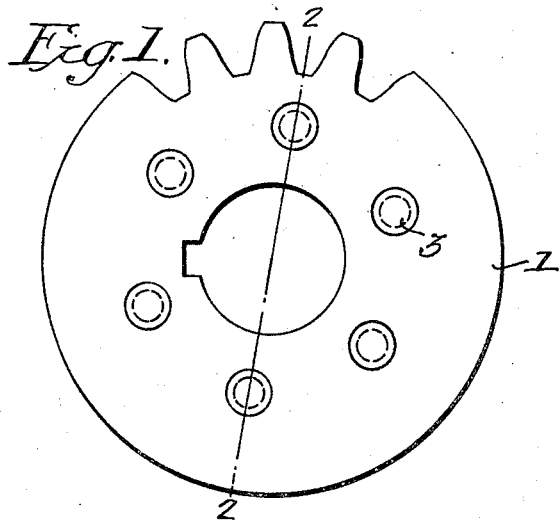
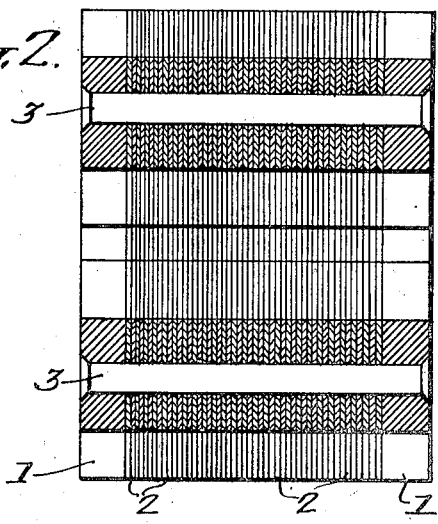
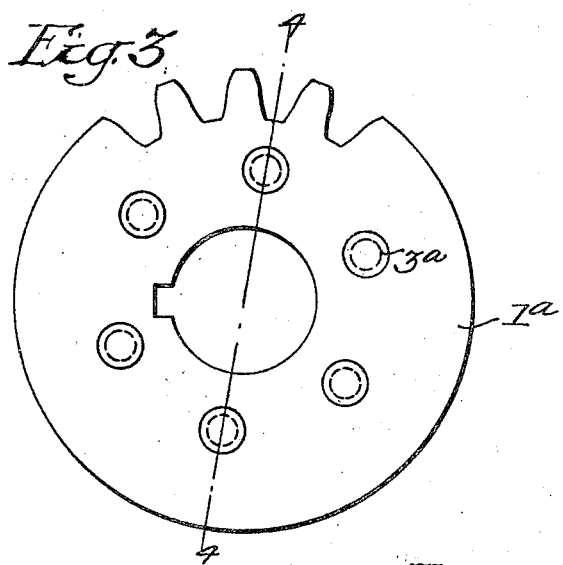
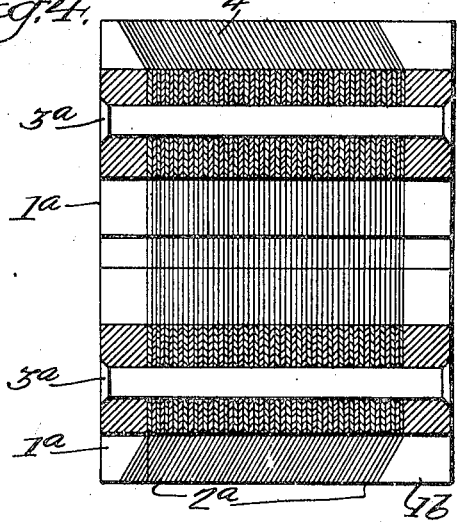
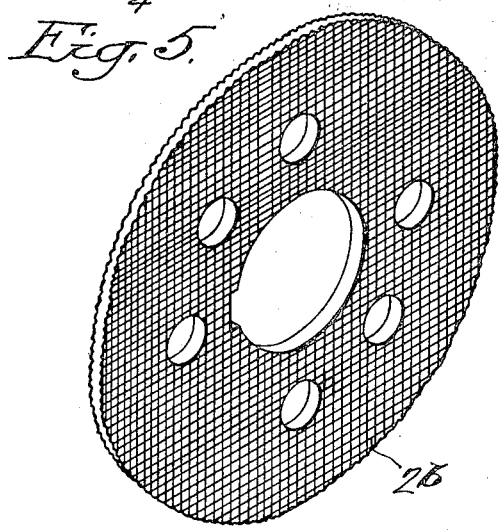
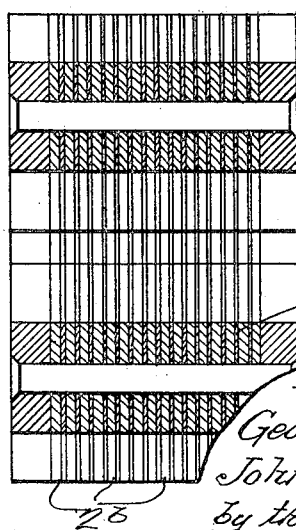
Inventors,
George A. Dalton,
John R. Durham,
by their Attorneys
Howson & Howson Jan. 1, 1929.                                                     1,697,720
G. A. DALTON ET AL
GEAR
Filed March 25, 1927           2 Sheets-Sheet 2
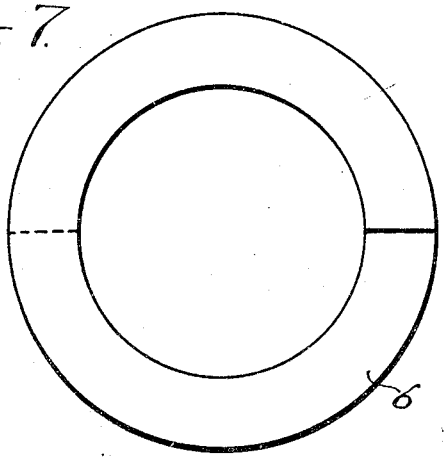
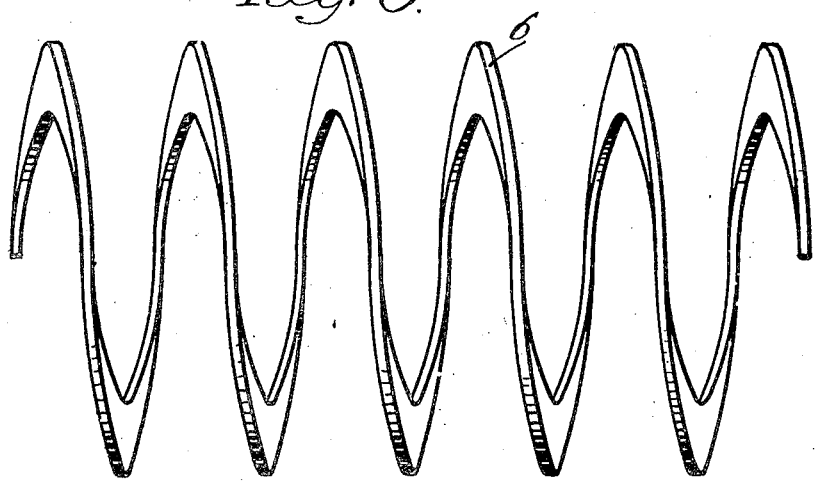
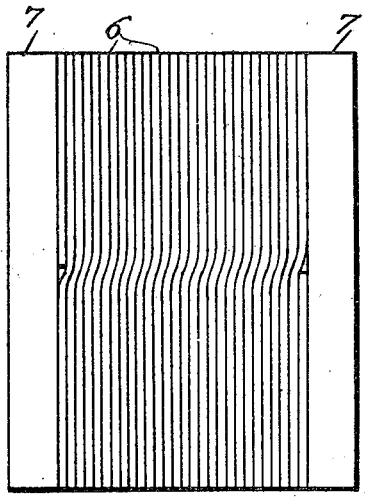
Inventors:-
George A. Dalton,
John R. Dunham,
by their Attorneys,
Howson & Howson Patented Jan. 1, 1929.

1,697,720

UNITED STATES PATENT OFFICE.

GEORGE A. DALTON AND JOHN R. DUNHAM, OF HIGHLAND PARK, NEW JERSEY, ASSIGNORS TO FLEXIBLE ENGINEERING CORPORATION, OF NEW YORK, N. Y., A CORPORATION OF NEW YORK.

GEAR.

Application filed March 25, 1927. Serial No. 178,264.

This invention relates to improvements in gears, and one of the objects of the invention is to provide a gear the novel construction of which affords silence in operation.

To this end, the invention contemplates the provision of a laminated gear body, and another object of the invention is to provide a novel laminated formation effectively eliminating from the gear certain inherent defects of this type of construction.

Another object of the invention is to provide a gear which will be self-lubricating.

These and other objects more fully described hereinafter we obtain by means of a construction illustrated in the attached drawings, in which:

Fig. 1 is a face view of a gear blank made in accordance with our invention in which several of the teeth have been cut;

Fig. 2 is a section on the line 2—2, Fig. 1;

Fig. 3 is a side view similar to that of Fig. 1 of a modified form of gear;

Fig. 4 is a section on the line 4—4, Fig. 3;

Fig. 5 is a view in perspective of a peculiar form of disk which may constitute one of the laminations of the gear;

Fig. 6 is a section similar to the sections of Figs. 2 and 4 and illustrating a further modification of the invention;

Figs. 7 and 8 are respectively side and end views of elements used in a modified form of our device, and Fig. 9 is a view illustrating the modification referred to in Figs. 7 and 8.

The noisiness of the usual type of metal gear is a serious objection to their use in certain classes of mechanism. Metal gears, however, particularly gears of steel, are desirable for their other characteristics of strength and durability. We have discovered that when, instead of forming the gear of a solid piece of metal, the gear is built up of a large number of relatively thin plates laid face-to-face to give a true laminated body, and while still employing the same materials of which the aforesaid solid metal gears have been made, the objectionable operating noises are largely or entirely eliminated. The laminated gear is effective to reduce or eliminate noises even when used in conjunction with the ordinary type of solid metal gear, but the characteristic is particularly noticeable when the co-acting gears are both or all of the laminated type.

By this invention, therefore, we are able to provide a gear which, while having all of the desirable characteristics of solid metal, say for example steel or iron, is at the same time comparatively noiseless in operation regardless of the type of gear with which it may be employed.

A gear of this type we have illustrated in Figs. 1 and 2 of the attached drawings, the gear in a preferred form comprising a pair of relatively heavy side or facing plates 1 between which are held face-to-face a sufficient number of thin disks 2 to give a gear of the required width. In the present instance, the laminated body is held together by means of rivets 3 passed through the end plates and the disks 2 and riveted in the said end plates, as clearly illustrated.

In some instances, and particularly where relatively soft metals are employed in the gears with which the aforedescribed laminated gear meshes, the laminated formation is disadvantageous by reason of a tendency of the individual disks to cut or wear grooves in the faces of the opposing gear teeth. This we have entirely eliminated by the construction shown in Fig. 4. In this instance, the general construction is the same as that shown in Fig. 1, the gear comprising facing plates 1$^a$ and 1$^b$ and a plurality of thin disks 2$^a$ secured between the facing plates by means of rivets 3$^a$. In this instance, the inner faces of the plates 1$^a$ and 1$^b$ are beveled at the periphery, the depth of the bevel, radially, corresponding with the height of the tooth in the finished gear. The bevels in the plates 1$^a$ and 1$^b$ are complementary, as clearly illustrated, so that when these plates are drawn tight upon the disks 2$^a$, the peripheral portions of the disk are bent out of their normal plane, as illustrated in Fig. 4. When under these circumstances the teeth are cut in the gear blank, the dividing lines between the disks 2$^a$, instead of being throughout perpendicular to the axis of rotation of the gear, are, at least in the toothed portion, inclined thereto as shown at 4 in Fig. 4. The relative movement of the meshing gear teeth therefore is in planes intersecting the dividing lines between the disks 2$^a$, and the aforesaid grooving tendency is avoided.

This gear lends itself particularly well to self-lubrication. In Figs. 5 and 6, we have illustrated the gear constructed with this in view. In this instance, the disks 2ᵇ have inserted therebetween a suitable solid lubricant 5 which is exposed and maintains effective lubrication at the surfaces of the teeth. The lubricant may be of any sort, but in a preferred form it consists of solid self-sustaining graphitic disks which may be inserted and held between the disks 2ᵇ. In some instances, it is desirable to score or corrugate the side faces of the disks 2ᵇ in order to retain the lubricant, as shown in Fig. 5. When such scorings or corrugations are employed, the lubricant may be of a plastic nature, only sufficient being placed between the disks as can be held in the grooves in the contacting faces.

We have further discovered that the noiseless characteristics of the gear may be accentuated by coating or plating the individual disks with a metallic coating such as tin. This tin coating further reduces the tendency of the gear to ring or sound under blows or sharp contacts.

Instead of forming the laminated structure by means of disks, as described above, we may employ a continuous flat strip of metal rolled or otherwise made into spiral form, as shown in Figs. 7 and 8. By confining this spiral form 6 between suitable end flanges or plates 7, as shown in Fig. 9, a structure is obtained which in all essential respects is the same as the laminated structure previously described and which for the purposes of the present application may be considered a truly laminated structure.

We claim:

A laminated gear in which the faces of the individual laminæ are scored for reception of a lubricant, said scorings extending to the tooth surfaces of the gear.

GEORGE A. DALTON.
JOHN R. DUNHAM.